United States Patent Office 3,162,532
Patented Dec. 22, 1964

3,162,532
PHOTOCONDUCTIVE LAYERS FOR ELECTRO-PHOTOGRAPHIC PURPOSES
Helmut Hoegl, Wiesbaden, and Wilhelm Neugebauer, Wiesbaden-Biebrich, Germany, assignors, by mesne assignments, to Azoplate Corporation, Murray Hill, N.J., a corporation of New Jersey
No Drawing. Filed June 13, 1960, Ser. No. 35,417
Claims priority, application Germany June 25, 1959
20 Claims. (Cl. 96—1)

As photoconductve layers for electrophotographic purposes, inorganic substances, such as selenium and zinc oxide as well as several organic low molecular weight substances, such as anthracene, chrysene or benzidine have already been used.

Now, photoconductive layers for electrophotographic purposes have been found, which consist, at least partially, of at least one polymerization product, or copolymerizate of polynuclear aromatic hydrocarbons having vinyl substituents, and/or the substitution products thereof.

Suitable photoconductive substances according to the present invention are polymerizates and copolymerizates of polynuclear aromatic substances carrying vinyl groups, and which may be substituted. Especially suitable substituents for these aromatic vinyl compounds are electron-releasing substituents, such as are described by L. F. and M. Fieser, "Organic Chemistry," second edition, page 604, Table I, viz., alkyl groups, such as methyl ethyl propyl, butyl, isobutyl, and amyl, alkoxy groups, such as methoxy, ethoxy, propoxy, and butoxy; dialkylamino groups, such as dimethylamino, diethylamino, dipropylamino, and dibutylamino; hydroxyl groups esterified with carboxylic acids, such as acetic acid, and propionic acid, free hydroxyl groups and amino groups. Dialkylamino groups are of particular advantage. Suitable copolymerizates are those of the above aromatic vinyl compounds with each other or with other compounds having polymerizable double bonds, such as acenaphthylene, preferably with mono-nuclear aromatic vinyl compounds, such as styrene and methyl styrene.

The following polynuclear aromatic vinyl compounds are exemplary: vinylnaphthalenes, such as 1-vinylnapthalene, and 2-vinylnaphthalene; vinylanthracenes, such as 1-vinylanthracene, and 9-vinylanthracene; vinyldiphenyls, such as 4-vinyldiphenyl, and 3-vinyldiphenyl; vinyl fluorenes, such as 2-vinylfluorene; vinylacenaphthenes, such as 5-vinylacenaphthene, vinylphenanthrenes, such as 2-vinylphenathrene, and 3-vinylphenanthrene; vinylpyrenes, such as 3-vinylpyrene; vinylnaphthacenes, such as 2-vinylnaphthacene; vinylperylenes, such as 3-vinylperylene; 6-methoxy-2-vinyl-naphthalene, 1-methoxy-2-vinyl-naphthalene, 4-methoxy-1-vinyl-naphthalene, 6-methoxy-1-vinyl-naphthalene; 9-vinyl-10-methyl-anthracene, 9-vinyl-10-ethyl-anthracene, and 6-acetoxy-2-vinyl-naphthalene.

The polymerizates and copolymerizates of the polynuclear aromatic vinyl compounds can be prepared by known polymerization processes, such as block, dispersion or suspension polymerization, using as catalysts known radical forming agents, such as peroxides or azo compounds. By the block polymerization processes, the monomer is advantageously melted, the radical forming agent is added and when the polymerization has been completed, the product thus obtained is purified by dissolving it in a solvent and reprecipitating it again. The process can also be performed in the presence of an inert solvent, whereby the polymerizate generally precipitates. The precipitate is filtered off, if necessary washed with a solvent, and subsequently dried. The polymerization product thus obtained can be further purified by reprecipitation.

A further method for producing polymeric compounds according to the present invention, consists in heating the corresponding carbinol compounds with a dehydrating agent, if necessary under reduced pressure, thus causing dehydration, which may be accompanied by polymerization. The polymerization products can be purified by reprecipitation from solvents.

According to the methods described above, there are obtained polymerizates corresponding to the following general formula

wherein R is a polynuclear aromatic radical, which may be substituted, and $n$ is an integer greater than 1.

Depending on the reaction conditions, such as temperature, solvent and the kind and quantity of the catalyst or the dehydrating agent used, polymerizates of different polymerization degrees are obtained. The relatively high molecular weight compounds of this kind are mostly resin-like compounds and can be applied to base materials as photoconductive layers without the use of binding agents.

The monomeric polynuclear aromatic vinyl compounds, which are polymerized, are prepared either from the corresponding acetyl or aldehyde derivatives of the basic hydrocarbons or the substitution products thereof, respectively, detailed descriptions of which are to be found in the literature.

If acetyl compounds are used for the production of the vinyl compounds, they are reduced to the corresponding carbinol, either by means of hydrogen in the presence of Raney nickel and alkali at room temperature, or at higher temperature in the presence of copper chromate catalysts or according to Meerwein-Ponndorf by aluminum isopropylate. The vinyl compounds are then prepared by distilling or heating the carbinol in the presence of a dehydrating agent, e.g., potassium bisulfate.

Alternatively, the corresponding aldehyde may be reacted according to the method of Grignard with methyl magnesium halide and the carbinol thus obtained may be dehydrated as described above. Or, the monomers used as starting products may be produced by dehydrogenating aromatic ethyl compounds and dehydrohalogenating α- or β-halogen ethyl derivatives of aromatic compounds. Such methods of production are described, e.g., by D. T. Mowry, M. Renoll and W. F. Huber in "Journal of the American Chemical Society," 68 (1946), page 1105, by G. E. Hawkins in "Journal of the Chemical Society" (London) (1957), page 3858, by R. G. Flowers and F. S. Nichols in "Journal of the American Chemical Society," 71 (1949), page 3104, and by Calvin E. Schildknecht in "Vinyl and Related Polymers," John Wiley & Sons, New York, 1952.

In order to use the highly polymeric reaction products described above as photoconductive layers for electrophotographic purposes, they are applied, advantageously after being dissolved in an organic solvent, to a support, e.g. by casting, coating or spraying and then evaporating the solvent. The products can also be applied to the support in the form of aqueous or non-aqueous dispersions. The base materials used as supports may be any that satisfy the requirements of electrophotography, e.g., metal or glass plates, paper or plates or foils made of electroconductive resins or plastics, such as polyvinyl alcohol, polyamides, and polyurethanes. Other plastics which have the required electroconductivity, such as cellulose acetate and cellulose butyrate, especially in a partially saponified form, polyesters, polycarbonates, and polyolefines, if they are covered with an electroconductive layer or if they are converted into electroconductive materials, e.g., by chemical treatment or by introduction of materials which render them electrically conductive, may also be used. Generally speaking, electroconductive supports are suitable for the purposes of the present invention. In the sense of the present invention, the term "electroconductive support" comprises materials having a specific conductivity higher than $10^{-12}$ ohm$^{-1}$.cm.$^{-1}$, preferably higher than $10^{-10}$ ohm$^{-1}$.cm.$^{-1}$.

The base material described above, provided with a thin coherent layer of uniform thickness of the photoconductive substances according to the present invention, is used for electrophotographically producing copies by evenly charging the photoconductive layer in the absence of light by means of a corona discharge from a charging device maintained at about 6000 to 7000 volts. Subsequently, the electrophotographic material is exposed to light in contact with a master, or by episcopic or diascopic projection of a master; an electrostatic image corresponding to the master is thus obtained. This invisible image is developed by contacting it with a developer consisting of a carrier and a toner. Suitable carriers are, e.g., fine glass balls, iron powder or fine plastic balls. The toner consists of a resin-carbon black mixture or a colored resin. The toner is usually used in a grain size of about 1–100μ, preferably 5–30μ. The developer may also consist of a resin or pigment suspended in a dielectric liquid in which, if desired, resins have been dissolved. The image which has been made visible by development is fixed, e.g., by heating it with an infrared radiator to a temperature of 100–170° C., preferably 120–150° C., or by treatment with solvents, such as trichloroethylene, carbon tetrachloride, ethyl alcohol or steam. Images are thus obtained which are rich in contrast. If a polarity of the electrical charge is used which is opposite to the polarity of the toner contained in the developer, images corresponding to the master characterized by good contrast effect are obtained. By changing the polarity of the corona discharge, it is also possible to obtain reversal images from the same master and with the same developer. However, it is preferred also to change from a positive master to a negative master and vice versa, when changing the polarity to obtain the best results. This is an advantage over the inorganic photoconductors such as zinc oxide or selenium, which can be charged with one polarity only to give good images.

For transforming the electrophotographic images into printing plates, they are wiped over with a suitable solvent, rinsed with water and inked with greasy ink. Printing plates are thus obtained which may be clamped to an offset printing machine and used for printing.

If transparent supports are used, the electrophotographic images can also be used as masters for the production of additional copies on any type of light-sensitive layers. When using translucent supports for the photoconductive layers, reflex images can also be produced.

The photoconductive layers of the present invention absorb light mainly within the ultraviolet range of the spectrum. The sensitivity of the photoconductive layers can be improved by the addition of activating substances. Such activators are organic compounds which in molecular complexes of the donor-acceptor type ($\pi$-complexes, charge transfer complexes) can serve as electron acceptors. They are compounds of a high electron affinity and acids, according to the definition of Lewis. Substances of such nature are those containing strongly polarizing residues or groups, such as the cyano group or nitro group; halides, such as fluorine, chlorine, bromine, iodine; the ketone group or acid groups such as carboxylic groups or the quinone configuration. Such polarizing electron attracting groups are described by L. F. and M. Fieser in "Organic Chemistry," second edition, 1950, page 604, Table I. Due to their low vapor pressure, those substances are preferred which have a melting point above room temperature, viz. solid substances.

Moderately colored substances, such as quinones can be used, however, it is preferred to use colorless or only weakly colored substances. The preferred maximum of absorption of the substances is within the ultraviolet range of the spectrum, i.e., below 4,500 A. Moreover, the activator substances to be used according to the present invention should have low molecular weight, i.e., the molecular weight thereof should range between 50 and about 5000, preferably between about 100 and about 1000, since with the low molecular weight activators reproducible results, with respect to sensitivity, can be obtained. Moreover, the sensitivity is maintained constant over a long period, as, contrary to the high molecular weight substances, the low molecular weight substances do not change when stored.

Examples for such substances are:

| | |
|---|---|
| 2-bromo-5-nitro-benzoic acid | o-Chloro-nitrobenzene. |
| 2-bromo-benzoic acid | Chloro-acetophenone. |
| 2-chloro-toluene-4-sulphonic acid | 2-chloro-cinnamic acid. |
| Chloro-maleic acid anhydride | 2-chloro-4-nitro-1-benzoic acid. |
| 9-chloro-acridine | 2-chloro-5-nitro-1-benzoic acid. |
| 3-chloro-6-nitro-1-aniline | 3-chloro-6-nitro-1-benzoic acid. |
| 5-chloro-nitrobenzene-5-sulfochloride. | Phthalic acid anhydride. |
| 4-chloro-3-nitro-1-benzoic acid | Chloro-mucoic acid.v |
| 4-chloro-2-hydroxy-benzoic acid | Bromo-mucoic acid. |
| 4-chloro-1-phenol-3-sulfonic acid | Styrene-dibromide. |
| 2-chloro-3-nitro-1-toluene-5-sulfonic acid. | Xylene tetra-bromide. |
| 4-chloro-3-nitro-benzene-phosphonic acid. | $\beta, \beta, \beta$-Trichloro-lactonitrile. |
| Dibromo-succinic acid | Triphenyl-chloro-methane. |
| 2,4-dichloro-benzoic acid | Tetrachloro phthalic acid. |
| Dibromo-maleic acid anhydride | Tetrabromo phthalic acid. |
| 9,10-dibromo anthracene | Tetraiodo phthalic acid. |
| 1,5-dichloro-naphthalene | Tetrachloro-phthalic acid anhydride. |
| 1,8-dichloro-naphthalene | Tetrabromo-phthalic acid anhydride. |
| 2,4-dinitro-1-chloro naphthalene | Tetraiodo-phthalic acid anhydride. |
| 3,4-dichloro-nitrobenzene | Tetrachloro-phthalic acid-monoethylester. |
| 2,4-dichloro-benzisatin | Tetrabromo-phthalic acid-monoethylester. |
| 2,6-dichloro-benzaldehyde | Tetraiodo-phthalic acid-monoethylester. |
| Hexabromo-naphthalic acid anhydride. | Iodoform. |
| Bz-I-cyano-benzanthrone | Fumaric acid dinitrile. |
| Cyano-acetic acid | Tetra-cyano-ethylene. |
| 2-cyano-cinnamic acid | 1,3,5-tricyano-benzene. |
| 1,5-dicyano-naphthalene | |
| 3,5-dinitro-benzoic acid | 2,4-dinitro-1-chloro-naphthalene. |
| 3,5-dinitro-salicylic acid | 1,4-dinitro-naphthalene. |
| 2,4-dinitro-1-benzoic acid | 1,5-dinitro-naphthalene. |
| 2,4-dinitro-1-toluene-6-sulfonic acid | 1,8-dinitro-naphthalene. |
| 2,6-dinitro-1-phenol-4-sulfonic acid | 2-nitrobenzoic acid. |
| 1,3-dinitro-benzene | 3-nitrobenzoic acid. |
| 4,4'-dinitro-diphenyl | 4-nitro-benzoic acid. |
| 3,-nitro-4-methoxy-benzoic acid | 3-nitro-4-ethoxy-benzoic acid. |
| 4-nitro-1-methyl-benzoic acid | 3-nitro-2-cresol-5-sulfonic acid. |
| 6-nitro-4-methyl-1-phenol-2-sulfonic acid. | 5-nitro-barbituric acid. |
| 2-nitro-benzene-sulphinic acid | 4-nitro-acenaphthene. |
| 3-nitro-2-hydroxy-1-benzoic acid | 4-nitro-benzaldehyde. |
| 2-nitro-1-phenol-4-sulfonic acid | 4-nitro-phenol. |
| 4-nitro-1-phenol-2-sulfonic acid | Picric acid. |
| 3-nitro-N-butyl-carbazole | Picryl chloride. |
| 4-nitro-diphenyl | 2,4,7-trinitro-fluorenone. |
| Tetra-nitro-fluorenone | 1,3,5-trinitro-benzene. |
| 2,4,6-trinitro-anisol | |
| Anthraquinone | 1-chloro-2-methyl-anthraquinone. |
| Anthraquinone-2-carboxylic acid | Duroquinone. |
| Anthraquinone-2-aldehyde | 2,6-dichloro-quinone. |
| Anthraquinone-2-sulfonic acid-anilide. | 1,5-diphenoxy-anthraquinone. |
| Anthraquinone-2,7-disulfonic acid | 2,7-dinitro-anthraquinone. |
| Anthraquinone-2,7-disulfonic acid-bis-anilide. | 1,5-dichloro-anthraquinne. |
| Anthraquinone-2-sulfonic acid-dimethylamide. | 1,4-dimethyl-anthraquinone. |
| Acenaphthene-quinone | 2,5-dichloro-benzoquinone. |
| Anthraquinone-2-sulfonic acid-methylamide. | 2,3-dichloro-naphthoquinone-1,4. |
| Acenaphthene-quinone-dichloride | 1,5-dichloro-anthraquinone. |
| Benzoquinone-1,4 | 1-methyl-4-chloro-anthraquinone. |
| 1,2-benzanthraquinone | 2-methyl-anthraquinone. |
| Bromanil | Naphthoquinone-1,2. |
| 1-chloro-4-nitro-anthraquinone | Naphthoquinone-1,4. |
| Chloranil | Pentacene-quinone. |
| 1-chloro-anthraquinone | Tetracene-7,12-quinone. |
| Chrysene-quinone | 1,4-tolu-quinone. |
| Thymo-quinone | 2,5,7,10-tetrachloro-pyrene-quinone. |

The quantity of activator which is advantageously added to the photoconductors can be easily determined by simple experiments. It varies according to the substance used and usually amounts from about 0.1 to about 100 moles, preferably from about 1 to about 50 moles based on 1000 moles of photoconductive substance. Mixtures of several activator substances can also be used. Besides these substances, dyestuff sensitizer may also be added.

By the addition of the activating substances, photoconductive layers can be produced which are highly light-sensitive, especially within the ultraviolet range and they are practically colorless. By means of these substances, it is also possible to strongly activate the photoconductive layers within the ultraviolet range, whereupon a high degree of sensitivity of the photoconductive layers within the range of visible light can be obtained by a very small addition of optical sensitizers, without so much of the dyestuff-sensitizers being applied as to obtain highly colored layers.

Very small quantities of the dyestuff sensitizers are capable of extending the sensitivity of the layers from the ultraviolet range into the visible range of the spectrum. Additions of less than 0.01 percent of the dyestuff sensitizers are effective. In general, however, quantities of from 0.01 to 5 percent, preferably 0.05 to 3 percent of the dyestuff sensitizers are added. Additions of larger quantities are possible but, in this case, no increase in sensitivity will, in general, be achieved. If the dyestuff sensitizers are used without the addition of activators, it is advisable generally to use quantities approaching the upper limits stated above.

The following substances may be listed as examples of dyestuff sensitizers which can be used with good or very good effect. They are taken from the "Farbstofftabellen" by Schultz, 7th edition, 1931, vol. 1:

Triarylmethane dyestuffs such as Brilliant Green (No. 760, page 314), Victoria Blue B (No. 822, page 347), Methyl Violet (No. 783, page 327), Crystal Violet (No. 785, page 329), Acid Violet 6B (No. 831, page 351); xanthene dyestuffs, namely rhodamines, such as Rhodamine B (No. 864, page 365), Rhodamine 6G (No. 866, page 366), Rhodamine G Extra (No. 865, page 366), Sulphorhodamine B (No. 863, page 364) and Fast Acid Eosin G (No. 870, page 368), as also phthaleins such as Eosin S (No. 883, page 375), Eosin A (No. 881, page 374), Erythrosin (No. 886, page 376), Phloxin (No. 890, page 378), Bengal Rose (No. 889, page 378), and Fluorescein (No. 880, page 373); thiazine dyestuffs such as Methylene Blue (No. 1038, page 449); acridine dyestuffs such as Acridine Yellow (No. 901, page 383), Acridine Orange (No. 908, page 387) and Trypaflavine (No. 906, page 386); quinoline dyestuffs such as Pinacyanol (No. 924, page 396) and Cryptocyanine (No. 927, page 397); cyanine dyestuffs, e.g., Cyanine (No. 921, page 394) and chlorophyll.

The photoconductive layers described above may be used in reproduction processes as well as in measuring techniques for recording purposes, e.g., photographic recorders. They are, however, also suitable for the production of other devices containing photoconductors, such as photoelectric cells, photoelectric resistors, and television receiver tubes.

The photoconductive layers according to the present invention may be used in admixture with other photoconductors, with pigments, such as zinc oxide, or titanium dioxide, or if desired with resins such as ketone resins. It is, however, one of their advantages that being high molecular weight practically colorless substances, they can be applied to the supports in the form of homogeneous transparent layers, and they require no additional binding agent or other substances to be excellent photoconductive layers.

Furthermore, if a paper base is used, coating is possible, without excessive coating solution penetrating into the base.

The invention will be further illustrated by reference to the following specific examples:

Example 1

A solution consisting of 1.54 parts by weight of poly-2-vinyl-naphthalene and 0.057 part by weight of tetrachloro-phthalic acid anhydride in 25 parts by volume of toluene is coated onto a superficially roughened aluminum foil and dried. The uniform, thin photoconductive layer adhering to the support of the electrophotographic material thus obtained is given a negative charge by means of a corona discharge and is then exposed to light for 20 seconds through a transparent original using a 100 watt incandescent lamp at a distance of 30 cm. A developer is then cascaded over the layer, an image of the master used being thus obtained which is anchored to the support by heating so that it can be wiped off. The developer used consists of a mixture of tiny glass balls (carrier) and a fine resin-carbon black mixture (toner). It is obtained by mixing 100 parts by weight of tiny glass balls of a particle size ranging from about 100 to about 400μ and 2.5 parts by weight of the toner of a particle size of about 20-50μ. The toner is prepared by melting together 30 parts by weight of polystyrene (Polystyrol LG), 30 parts by weight of a modified maleic acid resin ("Beckacite" K 105) and 3 parts by weight of carbon black ("Peerless Black" Russ 552) and then grinding and sieving the solidified melt.

If, in addition to 0.0143 part by weight of tetrachlorophthalic acid anhydride as an activator, 0.2 part by volume of a 1 percent solution of "Basisch Reinblau 3 G" in methanol is added to the layer described above, under the same conditions, the time of exposure is only 10 seconds.

If, instead of tetrachloronaphthalic acid anhydride, 0.0315 part by weight of 2,4,7-trinitrofluorenone is added as an activating substance under the conditions mentioned above, the time of exposure is only 0.2 second.

If 0.021 part by weight of anthraquinone is added to the poly-2-vinyl-naphthalene as an activating substance and a 125 watt high pressure mercury lamp is used under the same conditions, the time of exposure is only 1 second.

If 0.025 part by weight of chloranil is added and a 125 watt high pressure mercury lamp is used, the time of exposure amounts to 0.5 second.

If 0.022 part by weight of 1,5-dinitronaphthalene is added and a 125 watt high pressure mercury lamp is used, the time of exposure is 5 seconds.

Example 2

The method described in Example 1 is repeated, however, for coating the aluminum foil there is used a solution of 0.75 part by weight of poly-9-vinyl-anthracene in 15 parts by volume of benzene. When using a 125 watt high pressure mercury lamp, the time of exposure is 5 seconds.

Example 3

The process described in Example 1 is repeated, however, for coating the aluminum foil, there is used a solution containing 1 part by weight of poly-2-vinyl-fluorene in 20 parts by volume of benzene. When using a 125 watt high pressure mercury lamp, the time of exposure is 60 seconds.

Example 4

Paper is coated with a solution consisting of 10 parts by weight of a copolymerizate of styrene and 2-vinylnaphthalene (mole ratio 95.5), 0.1 part by weight of chloranil and 0.01 part by weight of Rhodamine B in 150 parts by volume of toluene and 2 parts by volume of methanol. The solvent is then evaporated and the process is further effected as described in Example 1. When using a 100 watt incandescent lamp, the time of exposure is 50 seconds.

It will be obvious to those skilled in the art that many modifications may be made within the scope of the present invention without departing from the spirit thereof, and the invention includes all such modifications.

What is claimed is:

1. An electrophotographic material comprising a conductive support layer and a photoconductive insulating layer, the latter comprising a solid polymer of at least one monovinyl aromatic polynuclear hydrocarbon and at least one compound selected from the group consisting of dyestuff sensitizers and activators for the photoconductor.

2. An electrophotographic material according to claim 1 in which the hydrocarbon is further substituted by electron-releasing substituents.

3. An electrophotographic material according to claim 1 in which the monovinyl aromatic polynuclear hydrocarbon is copolymerized with another polymerizable compound.

4. An electrophotographic material according to claim 2 in which the monovinyl aromatic polynuclear hydrocarbon substituted by electron-releasing substituents is copolymerized with another polymerizable compound.

5. An electrophotographic material according to claim 1 in which the polymer of the monovinyl aromatic polynuclear hydrocarbon is poly-2-vinyl-naphthalene.

6. An electrophotographic material according to claim 1 in which the polymer of the monovinyl aromatic polynuclear hydrocarbon is poly-9-vinyl anthracene.

7. An electrophotographic material according to claim 1 in which the polymer of the monovinyl aromatic polynuclear hydrocarbon is poly-2-vinyl fluorene.

8. An electrophotographic material according to claim 3 in which 2-vinyl-naphthalene is copolymerized with styrene.

9. A photographic reproduction process which comprises exposing an electrostatically charged, supported, photoconductive insulating layer to light under a master and developing the resulting image with an electroscopic material, the photoconductive layer comprising a solid polymer of at least one monovinyl aromatic polynuclear hydrocarbon.

10. A process according to claim 9 in which the hydrocarbon is further substituted by electron-releasing substituents.

11. A process according to claim 9 in which the monovinyl aromatic polynuclear hydrocarbon is copolymerized with another polymerizable compound.

12. A process according to claim 10 in which the monovinyl aromatic polynuclear hydrocarbon substituted by electron-releasing substituents is copolymerized with another polymerizable compound.

13. A process according to claim 9 in which the photoconductive layer contains at least one compound selected from the group consisting of dyestuff sensitizers and activators.

14. A process according to claim 10 in which the photoconductive layer contains at least one compound selected from the group consisting of dyestuff sensitizers and activators.

15. A process according to claim 11 in which the photoconductive layer contains at least one compound selected from the group consisting of dyestuff sensitizers and activators.

16. A process according to claim 12 in which the photoconductive layer contains at least one compound selected from the group consisting of dyestuff sensitizers and activators.

17. A process according to claim 9 in which the polymer of the monovinyl aromatic polynuclear hydrocarbon is poly-2-vinyl-naphthalene.

18. A process according to claim 9 in which the polymer of the monovinyl aromatic polynuclear hydrocarbon is poly-9-vinyl anthracene.

19. A process according to claim 9 in which the polymer of the monovinyl aromatic polynuclear hydrocarbon is poly-2-vinyl fluorene.

20. A process according to claim 11 in which 2-vinyl-naphthalene is copolymerized with styrene.

References Cited in the file of this patent

UNITED STATES PATENTS

| | | |
|---|---|---|
| 2,297,691 | Carlson | Oct. 6, 1942 |
| 2,471,785 | Seymour et al. | May 31, 1949 |
| 2,476,737 | Kern et al. | July 19, 1949 |
| 2,663,636 | Middleton | Dec. 22, 1953 |
| 2,697,028 | Baker et al. | Dec. 14, 1954 |
| 2,956,878 | Michiels | Oct. 18, 1960 |
| 3,037,861 | Sus et al. | June 5, 1962 |

FOREIGN PATENTS

| | | |
|---|---|---|
| 355,032 | Great Britain | Aug. 20, 1931 |
| 649,041 | Great Britain | Jan. 17, 1951 |
| 201,416 | Australia | Apr. 13, 1956 |
| 1,188,590 | France | Mar. 16, 1959 |
| 1,188,265 | France | Mar. 9, 1959 |

OTHER REFERENCES

Winslow et al.: J.A.C.S., vol. 77, pp. 4751–4756, September 20, 1955.